United States Patent
Schiele et al.

(10) Patent No.: US 10,315,684 B2
(45) Date of Patent: Jun. 11, 2019

(54) STEERING COLUMN FOR A MOTOR VEHICLE

(71) Applicants: ThyssenKrupp Presta AG, Eschen (LI); ThyssenKrupp AG, Essen (DE)

(72) Inventors: Emanuel Schiele, Lindau (B) (DE); Felix De Castro Riemann, Feldkirch (AT)

(73) Assignees: THYSSENKRUPP PRESTA AG, Eschen (LI); THYSSENKRUPP AG, Essen (DE)

( * ) Notice: Subject to any disclaimer, the term of this patent is extended or adjusted under 35 U.S.C. 154(b) by 161 days.

(21) Appl. No.: 15/504,260

(22) PCT Filed: Jul. 7, 2015

(86) PCT No.: PCT/EP2015/065463
§ 371 (c)(1),
(2) Date: Feb. 15, 2017

(87) PCT Pub. No.: WO2016/026608
PCT Pub. Date: Feb. 25, 2016

(65) Prior Publication Data
US 2017/0259843 A1    Sep. 14, 2017

(30) Foreign Application Priority Data

Aug. 18, 2014    (DE) ................. 10 2014 111 775

(51) Int. Cl.
*B62D 1/19*    (2006.01)
*B62D 1/184*    (2006.01)
*B62D 1/185*    (2006.01)

(52) U.S. Cl.
CPC ............. *B62D 1/195* (2013.01); *B62D 1/184* (2013.01); *B62D 1/185* (2013.01)

(58) Field of Classification Search
CPC ......... B62D 1/195; B62D 1/184; B62D 1/185
See application file for complete search history.

(56) References Cited

U.S. PATENT DOCUMENTS

| 4,915,412 A | 4/1990 | Yuzuriha et al. |
| 5,755,461 A | 5/1998 | Halacka et al. |

(Continued)

FOREIGN PATENT DOCUMENTS

| CN | 201863882 U | 6/2011 |
| DE | 1962183 A | 6/1970 |

(Continued)

OTHER PUBLICATIONS

Int'l Search Report for PCT/EP2015/065463 (dated Oct. 7, 2015).

(Continued)

*Primary Examiner* — Faye M Fleming
(74) *Attorney, Agent, or Firm* — thyssenkrupp North America, Inc.

(57) ABSTRACT

A steering column for a motor vehicle may include a holding device that is connectable to a chassis of a motor vehicle as well as a shifting device, which in the event of a crash is displaceable relative to the holding device along a displacement axis. The shifting device may be configured to receive a steering spindle. The steering column may further include a deformation element that is connected to the holding device and to the shifting device via a respective connection portion with respective fastening means. At least in some examples, the deformation element may include a deformation portion that is deformed about a deformation axis during displacement of the shifting device relative to the holding device. The deformation axis may be oriented substantially parallel to a surface normal of at least one connection portion in a center of the associated fastening means.

17 Claims, 3 Drawing Sheets

(56) References Cited

U.S. PATENT DOCUMENTS

| | | | |
|---|---|---|---|
| 7,188,867 B2* | 3/2007 | Gatti | B62D 1/195 280/777 |
| 7,455,321 B2* | 11/2008 | Menjak | B62D 1/195 280/777 |
| 8,033,574 B2* | 10/2011 | Menjak | F16F 7/123 280/777 |
| 8,596,683 B2* | 12/2013 | Ishii | B62D 1/195 280/775 |
| 8,689,659 B2* | 4/2014 | Schnitzer | B62D 1/195 280/777 |
| 8,955,883 B2* | 2/2015 | Nagase | B62D 1/18 280/775 |
| 2002/0020999 A1* | 2/2002 | Duval | B62D 1/195 280/777 |
| 2002/0036404 A1* | 3/2002 | Li | B62D 1/195 280/777 |
| 2003/0042723 A1* | 3/2003 | Riefe | B62D 1/195 280/777 |
| 2006/0214411 A1* | 9/2006 | Ikegaya | B62D 1/19 280/777 |
| 2006/0273568 A1* | 12/2006 | Manwaring | B62D 1/195 280/777 |
| 2007/0228717 A1* | 10/2007 | Tanai | B62D 1/195 280/777 |
| 2008/0111363 A1 | 5/2008 | Menjak et al. | |
| 2012/0080873 A1 | 4/2012 | Narita et al. | |
| 2012/0193902 A1* | 8/2012 | Akutsu | B62D 1/195 280/777 |

FOREIGN PATENT DOCUMENTS

| | | |
|---|---|---|
| DE | 29501552 U1 | 4/1995 |
| DE | 69501830 T2 | 8/1998 |
| DE | 69306326 T2 | 9/2009 |
| GB | 1296527 A | 11/1972 |
| WO | 2012/079096 A1 | 6/2012 |

OTHER PUBLICATIONS

Machine Translation of Description of DE29501552U1.
English Language Abstract for DE69501830T2.
English Language Abstract for DE69306326T2.

* cited by examiner

STEERING COLUMN FOR A MOTOR VEHICLE

CROSS REFERENCE TO RELATED APPLICATIONS

This application is a U.S. National Stage Entry of International Patent Application Serial Number PCT/EP2015/065463, filed Jul. 7, 2015, which claims priority to German Patent Application No. DE 10 2014 111 775.1 filed Aug. 18, 2014, the entire contents of both of which are incorporated herein by reference.

FIELD

The present disclosure generally relates to steering columns for motor vehicles, including steering columns that have a holding device connected to a chassis of a vehicle and a shifting device that is displaceable in a crash event relative to the holding device along a displacement axis.

BACKGROUND

The prior art discloses steering columns for motor vehicles, in which a holding device is provided which is connected to the chassis of the motor vehicle and on which a shifting device is provided which is displaceable relative to the holding device and, in the event of a crash, can be displaced along a displacement axis. A deformation element is customarily provided between the holding device and the shifting device, said deformation element being secured both to the holding device and to the shifting device. The deformation element has a deformation region which is deformed during a relative displacement of the shifting device relative to the holding device and can thereby absorb crash energy.

By means of this design of a steering column, it is possible to absorb the crash energy applied to the steering wheel by the driver in the event of a crash in a defined manner since the crash energy converts into deformation energy by means of the deformation of the deformation element. Accordingly, the safety of the steering column can be improved since crash energy applied to the steering wheel by the driver can be further dissipated. The steering wheel is thereby also moved further out of the area of danger.

Deformation elements with deformation portions are known in principle. The deformation portions can either be provided here as pure deformation portions or as bending and tearing deformation portions A telescopic steering column with a deformation element designed as a bending and tearing tab is known, for example, from DE 1 962 183 A, wherein the bending and tearing tab is provided here substantially coaxially with respect to the shifting device. A rolling up of the deformation portion correspondingly occurs in such a manner that the deformation portion of the bending and tearing tab expands in the radial direction to the displacement axis. Accordingly, a sufficiently large construction space has to be provided in order to allow the deformation of the bending tab to proceed in a defined manner even in the event of a crash and to prevent a collision of the deforming bending and tearing tab with other vehicle components.

U.S. Pat. No. 4,915,412 discloses a telescopic steering column in which a bending and tearing tab is located between bracket and outer steering column, said bending and tearing tab having to be mounted in a complicated mounting process since the clamping spindle extends through the bending and tearing tab.

U.S. Pat. No. 5,755,416 discloses a telescopic steering column in which a deformation portion is integrated in the bracket, i.e. the holding device. Since it is required for the bracket that the latter is as stiff as possible, but a defined deformation behavior is required for the deformation portion, the requirements imposed on the one component are contradictory, and therefore an adaptation to different types of vehicle is difficult.

SUMMARY

Starting from the known prior art, it is an object of the present invention to provide a steering column for a motor vehicle, which comprises a deformation element which is simple to mount and can be adapted to different types of motor vehicle.

Accordingly, a steering column for a motor vehicle is proposed which comprises a holding device which is connectable to the chassis of the motor vehicle, and a shifting device which, in the event of a crash, is displaceable relative to the holding device along a displacement axis, for accommodating a steering spindle, wherein a deformation element is connected to the holding device and to the shifting device via a respective connection portion with respective fastening means, and the deformation element comprises a deformation portion which is deformed about a deformation axis during the relative displacement of the shifting device in relation to the holding device. According to the invention, the deformation axis is oriented substantially parallel to the direction of the surface normal of at least one connection portion in the center of the associated fastening means.

The plane in which the displacement axis is arranged and which is simultaneously oriented perpendicular to the surface normal is referred to as the displacement plane.

Any known means for securing the position, such as, for example, holes, studs, rivets, screws, bolts and also an integrally bonded connection, such as, for example, welding or adhesive bonding, can be used as the fastening means.

The effect achieved by the fact that the deformation axis is arranged substantially perpendicular to the displacement plane is that, in the event of a crash, the deformation or the unrolling of the deformation element in its deformation portion takes place in a defined manner along said deformation axis. The extent of the deformation element therefore does not change in the "radial direction" of the shifting element. In one embodiment, the displacement axis can coincide with the rotation axis of the steering spindle, the steering spindle axis.

The displacement plane can advantageously be a plane which is oriented horizontally in the normal operating state of the motor vehicle.

Since, however, the deformation axis already stems substantially radially with respect to the shifting device or with respect to the displacement axis thereof, certain construction space requirements in the case of steering columns in the motor vehicle can be particularly advantageously met.

A deformation axis arranged substantially parallel to the direction of the surface normal of the connection portions is understood as meaning that said deformation axis encloses a spatial angle between the deformation axis and the direction of the surface normal of 0° to 20°, preferably 0° to 5°, particularly preferably of 0°.

The effect can thereby furthermore be achieved that the deformation element can be adapted to the respective specification of the motor vehicle and can correspondingly be used in different vehicle types without structural modifications to the shifting device or to the holding device having to be carried out for this adaptation. By means of the arrangement of the deformation axis parallel to the direction of the surface normal, a deformation element can accordingly be configured in such a manner that the energy absorption characteristic of the deformation element and therefore the energy absorption characteristic during the displacement of the shifting device in relation to the holding device in the direction of the displacement axis can be adapted to any vehicle type via the material thickness, the material and the geometry of the deformation portion or of the bending and tearing portion.

Accordingly, a very compact constructional form of the steering column can be achieved with nevertheless complete adjustability of the energy absorption characteristic.

Furthermore, the arrangement of the deformation axis substantially parallel to the direction of the surface normal makes it possible for the force engagement points on the shifting device and also on the holding device to be able to be located directly next to the deformation portion, and therefore a compact form of the deformation element is also made possible in this manner.

The deformation axis is preferably designed in such a manner that, during the displacement of the shifting device relative to the holding device, said deformation axis moves in the direction of the displacement direction, wherein said deformation axis remains arranged substantially parallel to the direction of the surface normal. "Substantially parallel" is understood here as meaning an orientation of the axes with respect to one another at an angle of at most +/−10°, +/−5°, but preferably precisely parallel to one another. In other words, during a displacement of the shifting device in relation to the holding device, the deformation axis moves in the direction of the front of the vehicle. Since the deformation portion is wound around the deformation axis, the deformation axis moves approximately at a half displacement speed in the direction of the front of the vehicle.

The deformation element is particularly preferably designed as a bending and tearing element which has a deformation portion which begins to tear in relation to a fixed portion of the deformation element and at the same time is deformed. This makes it possible to achieve a defined behavior of the deformation element in the manner known in principle also for the deformation element proposed here.

The deformation element is preferably arranged on the holding device via at least one first connection portion and on the shifting device via at least one second connection portion, wherein at least the direction of the surface normal of the first connection portion and/or of the second connection portion is formed orthogonally to the displacement plane. A plurality of first connection portions, particularly preferably two first connection portions, which preferably lie in a common plane, are advantageously provided here. This results in a deformation element which is simple to mount and which, because of the identical orientation of the connection portions on shifting device and holding device, can simply be fitted between holding device and shifting device and can then be secured. If required, a plurality of second connection portions can also be provided.

In a further embodiment, the one first connection portion or all of the first connection portions and the second connection portion are arranged in a common plane. In the embodiment, this plane is oriented parallel to the displacement plane.

In a particularly preferred refinement, all of the present first connection portions and at least one individual second connection portion are in each case arranged in a plane oriented in parallel and with respect to one another, as a result of which advantageous mounting is achieved. In the particularly preferred embodiment, this plane is oriented parallel to the displacement plane.

The deformation portion is preferably bent back on itself about the deformation axis and comprises an inner region and an outer region which lie opposite each other and which lie parallel to a plane spanned by the deformation axis and the displacement axis. In other words, the deformation portion is of U-shaped design and, in the event of deformation, is deformed about an imaginary axis, the deformation axis. Said deformation axis is not formed concretely and, in the event of deformation, moves in the direction of the deformation of the deformation portion. A space-saving design of the deformation element is thereby achieved, said deformation element accordingly comprising a deformation axis arranged perpendicular to the displacement plane. By means of this form of the deformation portion, the first and second connection portions lie substantially next to each other in the direction of the displacement axis.

In a further preferred design, two deformation portions are provided which are both connected to the second connection portion and each comprise a first connection portion. A symmetrical design of the deformation element can thus be achieved, said design permitting a uniform guidance of the shifting device in relation to the holding device. Particularly preferably here, the two deformation portions are oriented parallel to each other, and the first connection portion and the second connection portion are arranged perpendicular to the planes formed by the deformation portions.

A particularly compact design arises if the deformation portion is arranged perpendicular to the displacement direction next to the first connection portion and to the second connection portion. In other words, the two connection portions lie substantially next to each other and the deformation portion is arranged inbetween.

Particularly preferably, the first connection portion and/or the second connection portion comprise form-fitting recesses as fastening means, such as, for example, holes or cutouts, which are in engagement with mutually complementary form-fitting elements, such as, for example, bolts, studs or screws of the holding device and/or of the shifting device. The form-fitting connection can be designed in such a manner that it locks in the direction of the displacement axis in the event of a crash only during a displacement of the shifting device relative to the holding device. The form-fitting connection can be provided here with a high degree of play, as a result of which the tolerance requirements imposed on the components are reduced. For example, cast ribs or simple punched-out portions can serve to form the elements forming the form-fitting connection.

In a preferred design, the deformation element furthermore has latching elements which can be brought into engagement with a locking hook of a longitudinal adjustment of an adjustable, telescopic steering column, and therefore, in the different longitudinal positions of the shifting device relative to the holding device, the same displacement distance can always be covered by the deformation element in order accordingly to provide a defined crash behavior in every longitudinal position of the telescopic steering column.

In a further preferred design, the deformation element is provided on the displaceable shifting device via a connection to a clamping mechanism, in particular a clamping spindle, in order thereby likewise to achieve simple mounting of the steering column.

Furthermore, the deformation element can likewise be coupled to the pivot axis of an at least vertically adjustable steering column.

The described design can be used both with mechanically and with electrically adjustable steering columns. It can furthermore also be used with steering columns which are not of adjustable design.

DETAILED DESCRIPTION

Although certain example methods and apparatus have been described herein, the scope of coverage of this patent is not limited thereto. On the contrary, this patent covers all methods, apparatus, and articles of manufacture fairly falling within the scope of the appended claims either literally or under the doctrine of equivalents. Moreover, those having ordinary skill in the art will understand that reciting 'a' element or 'an' element in the appended claims does not restrict those claims to articles, apparatuses, systems, methods, or the like having only one of that element, even where other elements in the same claim or different claims are preceded by "at least one" or similar language. Similarly, it should be understood that the steps of any method claims need not necessarily be performed in the order in which they are recited, unless so required by the context of the claims. In addition, all references to one skilled in the art shall be understood to refer to one having ordinary skill in the art.

Preferred exemplary embodiments are described below with reference to the figures. Identical or similar elements or elements of identical action are denoted here by identical reference signs. To avoid redundancies, a repeated description of said elements in the description below will in part be omitted.

Figure 1:
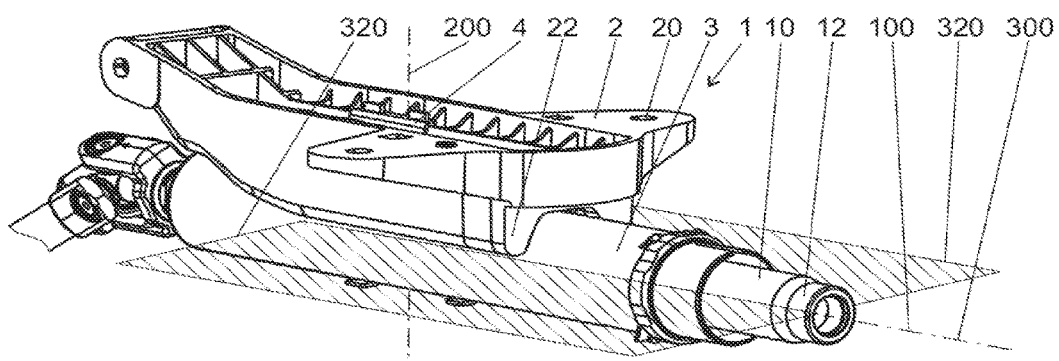
FIG. 1 is a schematic perspective view of an example steering column.

FIG. 1 shows a steering column 1 which comprises a holding device 2 which is connectable to the chassis of a motor vehicle, and a shifting device 3 which is displaceable relative to the holding device 2. A steering spindle 10 is arranged rotatably in the shifting device 3, which is designed here as an outer steering column, wherein a steering wheel (not illustrated) is connectable in a known manner to the front portion 12 of the steering spindle 10.

The holding device 2 comprises mounting recesses 20 via which the holding device 2 is connectable to the chassis of the motor vehicle. The holding device 2 furthermore has side cheeks 22 which partially surround the shifting device 3 and on which the shifting device 3 is guided. The shifting device 3 is displaceable relative to the holding device 2 in the direction of a displacement axis 300, which coincides with the steering spindle axis 100 in the exemplary embodiment shown, in the direction of the front of the vehicle.

Accordingly, in the event of a crash, the shifting device 3 can be displaced relative to the holding device 2 along the displacement axis 300 in the direction of the front of the vehicle in order, firstly, to achieve the effect that the steering wheel, which is connected to the steering spindle 10, is pushed out of the area of danger and, secondly, to provide a defined displacement distance along which applied crash energy can be further dissipated. In particular, crash energy which is applied to the steering wheel by a driver of the motor vehicle if the driver of the motor vehicle impacts against the steering wheel can be dissipated here.

Figure 2:
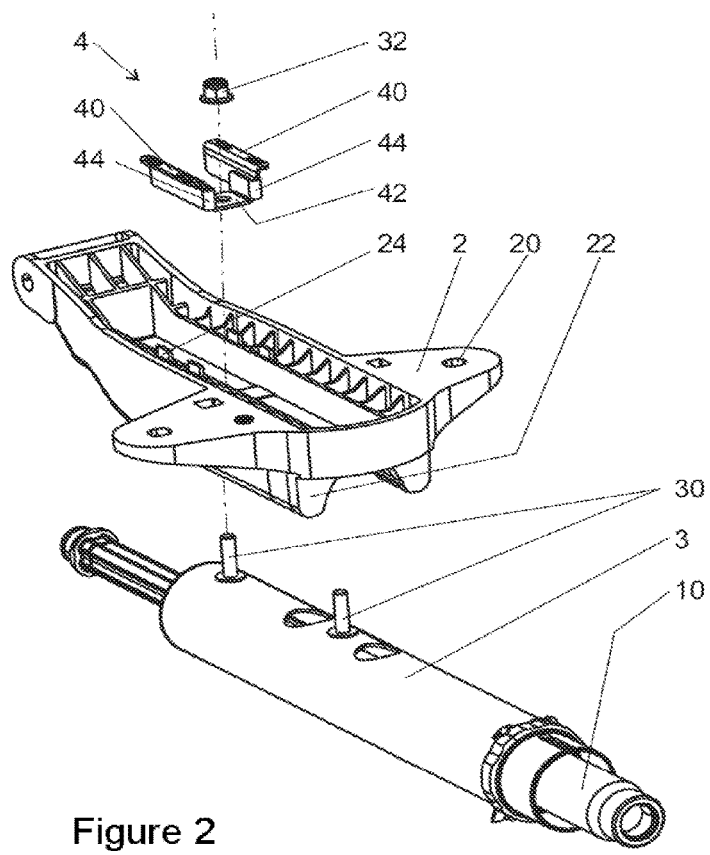
FIG. 2 is a schematic perspective view of the steering column of FIG. 1 in a pulled-apart illustration.
Figure 3:
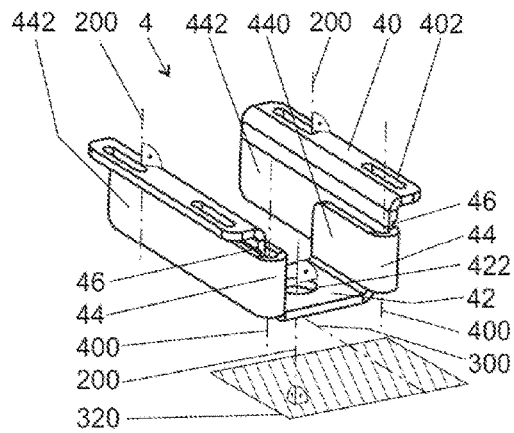
FIG. 3 is a schematic perspective view of an example deformation element of the steering column of FIGS. 1 and 2.

In order to provide a defined displacement with a large portion of the crash energy being converted, a deformation element 4 is provided which is shown once again in detail in FIGS. 2 and 3.

The deformation element 4 is secured on the holding device 2 via a first connection portion 40 and is connected to the shifting device 3 via a second connection portion 42. Accordingly, during a relative displacement of the shifting device 3 in relation to the holding device 2 in the direction of the displacement axis 300, a corresponding force can be exerted on the deformation element 4 via the first connection portion 40 and the second connection portion 42, said force leading to a deformation of a deformation portion 44 of the deformation element 4.

In the exemplary embodiment shown, the deformation element 4 is designed as a bending and tearing tab, wherein the deformation portion 44 is fixedly connected to the second connection portion 42. In the preferred embodiment, the component is produced integrally as a sheet metal bent and punched part and comprises two deformation portions 44 which are oriented parallel to each other. Particularly preferably, the deformation part 4 comprises two first connection portions 40 which are of flat design and comprise one or more punched-out portions (=form-fitting recesses 402) or studs for forming form-fitting elements and therefore serve as a fastening element. The planes of the first and/or second connection portions 40, 42 are preferably oriented here parallel to the displacement plane 320. However, the respective deformation portion 44 is connected with respect to the first connection portion 40 along a tearing line 46 which provides a defined tearing behavior. Accordingly, during a relative displacement of the first connection portion 40 in relation to the second connection portion 42, as occurs by the displacement of the shifting device 3 in relation to the holding device 2 when a force is applied to the shifting device 3 in the event of a crash, the deformation portion 44 is deformed and at the same time the deformation element 4 tears open along the tearing line 46. By means of the deformation and the tearing of the deformation element 4, which is thereby designed as a bending and tearing tab, a defined energy absorption with a defined energy absorption characteristic of the deformation element 4 correspondingly occurs. In other words, the crash energy can be converted in a defined manner into deformation and tearing energy over the displacement distance along the displacement axis 30 that is predetermined by the displaceability of the shifting element 3 in relation to the holding element 2. The precise energy absorption characteristic of the deformation element 4 can be provided via the material selection, the choice of the material thickness and the design of the tearing line and of the rest of the geometry of the deformation element 4.

During a relative displacement of the second connection portion 42 in relation to the first connection portion 40, the deformation portion 44 of the deformation element 4 is deformed about a deformation axis 400. The deformation portion 44 is correspondingly reshaped or bent over around the deformation axis 400, and therefore the deformation axis 400 migrates forward in the direction of the front of the vehicle, but remains in its orientation substantially parallel to the starting orientation. The deformation portion 44 is correspondingly unwound around the deformation axis 400.

The deformation portion 4 is bent back on itself about the deformation axis 400, in other words is of U-shaped design, and correspondingly comprises an inert region 440 and an outer region 442 which lie opposite each other and which lie parallel to a plane spanned by the deformation axis 400 and the displacement axis 300.

In the deformation element 4, in each case two deformation portions 44 are directly arranged on the second connection portion 42, said deformation portions being arranged parallel to each other in such a manner that their respective deformation axes 400 are also arranged parallel to each other, wherein the inner region 440 of the deformation portion 44, which inert region is arranged on the second connection portion 42, can be supported on the outer region 442 as long as the deformation portion 44 is deformed about the deformation axis 400. Accordingly, a defined deformation takes place here. Furthermore, because of the U-shaped connection of the deformation portion 44 to the second deformation portion 42 and the corresponding supporting of the inner region 440 on the outer region 442, which is likewise connected at a 90° angle to the first connection portion 40, a very stable support of the deformation portion 44 is ensured even during the deformation, and therefore a defined deformation can be carried out with little requirement for construction space.

Form-fitting recesses 402 are provided on the first connection portion 40 as fastening means which can be brought into engagement with mutually complementary form-fitting elements 24 of the holding device 2. As emerges for example from FIG. 2, the deformation element 4 can be placed from above onto the form-fitting elements 24 with the form-fitting recesses 402, and therefore a simple fastening means arises for securing the deformation element with respect to the holding device 2.

The deformation element 4 is furthermore connectable to its second connection portion 42 via a mounting bolt 30 which projects out of the shifting device 3 radially with respect to the steering spindle axis 100, wherein a mounting bore 422 is provided as fastening means in the second connection portion 42, said mounting bore being penetrated by the mounting bolt 30. The deformation element 4 can then be secured via a lock nut 32.

The shifting device 3 can thereby be secured in a simple manner on the holding device 2, and therefore, for the connection of the deformation element 4 both to the holding device 2 and to the shifting devices, a single lock nut via which the deformation element 4 is connected both to the shifting device 3 via the second connection portion 42 and to the holding device 2 via the first connection portion 40 merely has to be tightened. At the same time, the tightening of the lock nut 32 makes it possible to connect the shifting device 3 to the holding device 2 in a displaceable manner.

In the deformation element 4 shown in FIGS. 1 to 3, the respective force engagement points, i.e. in particular the first connection portion 40 with the form-fitting recesses 402 and the second connection portion 42 with a mounting bore 422 are therefore located in the immediate vicinity both of the deformation portion 44 and of the deformation axis 400, and therefore a defined deformation of the deformation portion 44 about the deformation axis 400 takes place.

Figure 5:
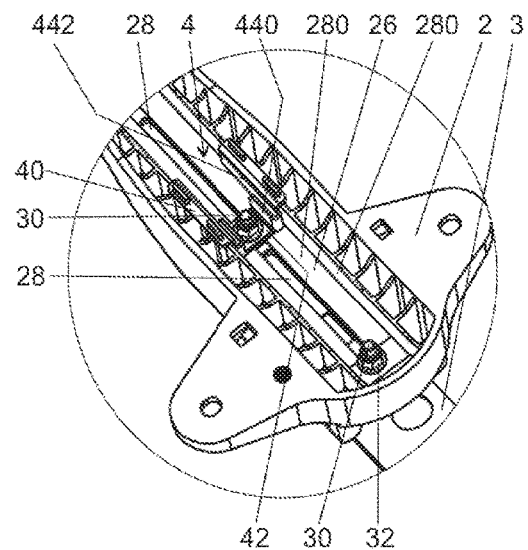
FIG. 5 is a schematic perspective detailed view of the steering column of FIGS. 1 to 3 in a starting position.
Figure 6:
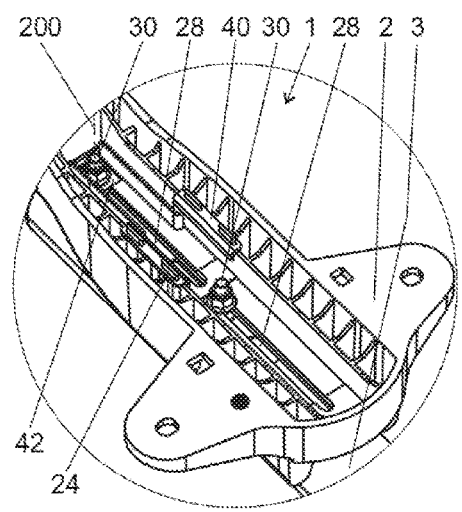
FIG. 6 is a schematic perspective detailed view of the steering column of FIG. 5 in a displaced position.

FIGS. 5 and 6 show, in a detailed illustration of the steering column 1 of FIGS. 1 to 3, the mounting of the deformation element 4 in a corresponding channel-shaped guide 26 of the holding device 2, wherein the mounting bolt 30 of the shifting device 3 extends through an elongated hole 28 of the holding device 2 and is then correspondingly held in a displaceable manner via the second connection portion 42, which also serves as a washer in this form, and the lock nut 32. The second mounting bolt 30 extends through a further elongated hole 28 and is likewise secured via a lock nut 32.

The channel-shaped guide 26 is of U-shaped design and, in addition to the channel base 280, also comprises two mutually opposite channel walls 228 which are oriented parallel to each other and are oriented parallel to the inner region 440 and the outer region 442 of the deformation portion 44 in such a manner that both the inner region 440 and the outer region 442 can be supported on the channel walls 228.

FIG. 6 shows the steering column 1 in a displaced position in which the deformation portion 44 around the deformation axis 400 is unwound, the shifting device 3 is correspondingly displaced in relation to the holding device 2 in the direction of the front of the vehicle and the mounting bolts 30 have correspondingly arrived at the front end of the elongated holes 28 of the holding device 2. The shifting device 3 has accordingly carried out a displacement distance in relation to the holding device 2 in the direction of the front of the vehicle, said displacement distance corresponding to the length of the elongated holes 28, and at the same time the deformation element 4 is deformed in its deformation portion 44. It correspondingly arises that, by means of the deformation of the deformation element 4 in its deformation portion 44, a defined energy absorption of the applied crash energy has taken place.

The deformation element 4 illustrated in FIGS. 1 to 3, 5 and 6 comprises the deformation axis 400 which is arranged substantially both parallel to the direction of the surface normal 200 of the first connection portion 40 and parallel to the direction of the second connection portion 42.

The fact that the deformation axis 400 is arranged substantially parallel to the direction of the surface normal 200 is understood as meaning that the spatial angle between the deformation axis 400 and the direction of the surface normal 200 lies within a range of 0° to 10°, preferably at an angle of 0° to 5°, particularly preferably at precisely 0° and is therefore ideally parallel.

The deformation axis 400 or the deformation axes 400 of the deformation element 4 is or are correspondingly also arranged substantially parallel to the radial direction of the shifting device 3, which radial direction is defined, for example, by the mounting bolts 30.

The effect which can be achieved by the deformation axis 400 being arranged substantially parallel to the direction of the surface normal and therefore also perpendicular to the displacement plane 320 is that a defined deformation of the deformation portion 44 is achieved, which deformation does not require any additional construction space but rather moves substantially in the construction space predetermined by the deformation element 4. This correspondingly results in a particularly compact construction of the deformation element 4 and therefore of the entire steering column 1. The deformation element 4 can furthermore be adapted in a simple manner to the respective specifications of the motor vehicle, and therefore there is great design freedom for the bending tab or a corresponding bending and tearing tab.

It furthermore arises that, by means of the parallel arrangement of the deformation axis 400 with respect to the direction of the surface normal 200, simple mounting can be achieved since an insertion of the deformation element 4 in the direction of the deformation axis 400 is made possible and, accordingly, by simple plugging together of the holding device 2, of the shifting device 3 and of the deformation element 4 and subsequent securing of the three elements to one another via a single lock nut 32, the mounting process can be ended.

Figure 4:
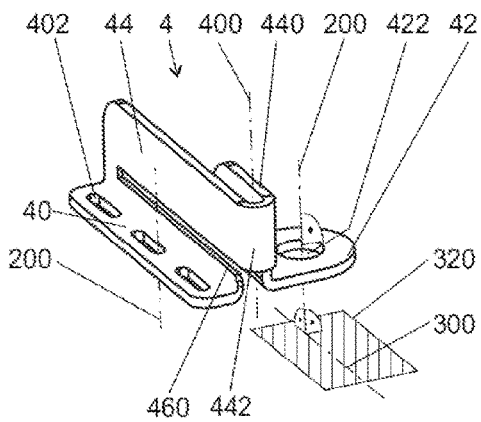
FIG. 4 is a schematic perspective view of another example deformation element.

FIG. 4 provides a further exemplary embodiment of a deformation element 4 which comprises a first connection portion 40 for connection to a holding device via form-fitting recesses 402 which serve as fastening means. The second connection portion 42 can be connected, for example, to the shifting device 3 via a mounting bore 422. The first connection portion 40 and the second connection portion 42 are arranged in a plane which is formed parallel to the displacement plane 320.

The deformation portion 44 is in turn designed in such a manner that an inner region 440 of the deformation portion 44 is connected directly to the second connection portion 42, and an outer region 442 of the deformation portion 44 is connected to the first connection portion 40. Instead of a tearing line, a slot 460 which clearly separates the deformation portion 44 from the first connection portion 40 is provided here.

The deformation axis 400 is in turn arranged substantially parallel to the direction of the surface normal 200.

Figure 7:
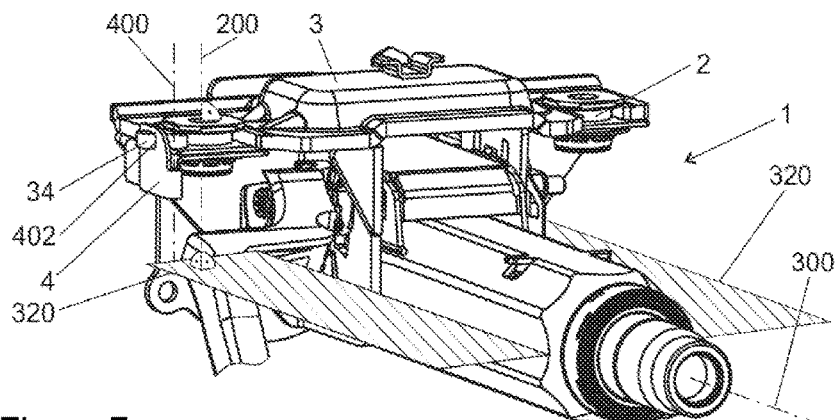
FIG. 7 is a schematic perspective view of another example steering column.
Figure 8:
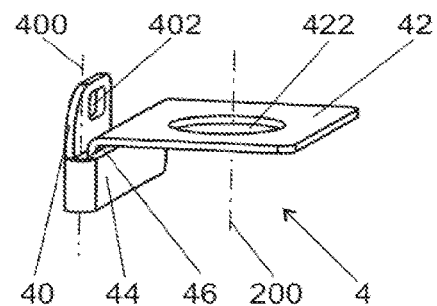
FIG. 8 is a schematic perspective view of the deformation element of FIG. 7.

FIGS. 7 and 8 show a steering column 1 in a further exemplary embodiment, wherein the steering column 1 in this exemplary embodiment comprises a holding device 2 in the form of a sliding capsule which is secured to the chassis of the motor vehicle and on which a shifting device 3 in the form of the steering column 1 and in particular of the bracket of the steering column is provided. In the event of a crash, the steering column 1 and in particular the shifting device 3 move in relation to the holding devices 2, which are designed as sliding capsules, in the direction of the front of the vehicle. In order to achieve a defined displacement of the shifting device 3 in relation to the holding device 2, a deformation element 4 is in turn provided which is secured via a form-fitting element 34, which is arranged on the shifting device 3 and which engages in a form-fitting recess 402 of the deformation element 4. Furthermore, a mounting bore 422 is provided via which the deformation element 4 is secured on the holding device 2 by the bolt of the sliding capsule penetrating the mounting bore 422.

A deformation portion 44 which is arranged perpendicular to the displacement plane 320 is in turn provided.

The mounting bore 422 is provided in a second connection portion 42, and the form-fitting recess 402 is provided in a first connection portion 40 of the deformation element 4.

The deformation portion 44 is connected directly to the first connection portion 40 and is connected to the second connection portion 42 via a tearing line 46. A deformation of the deformation portion takes place about the axis defined by the deformation axis 400 when a relative displacement of the first connection portion 40 with respect to the second connection portion 42 takes place whenever the shifting device 3 is displaced in relation to the holding device 2.

In the exemplary embodiment, the deformation axis 400 is oriented parallel to the direction of the surface normal 200 of the second connection portion 42, wherein the direction of the surface normal 200 is arranged orthogonally to the displacement plane 320.

Figure 9:
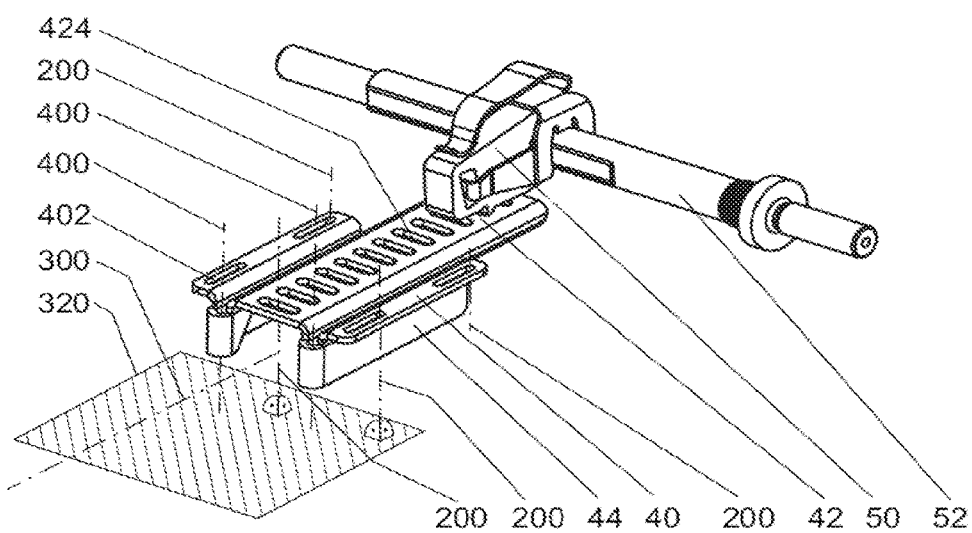
FIG. 9 is a schematic perspective view of still another example deformation element with a latching mechanism.

FIG. 9 shows, in a further exemplary embodiment, a further deformation element 4 in which a first connection portion 40 is provided which can be secured in turn to the shifting device 3 via form-fitting recesses 402. A second connection portion 42 is provided which comprises latching recesses 424 which can come into engagement with a latch 50 which serves as the fastening means. The latch 50 is held in a steering column, for example via a clamping spindle 52 of a clamping mechanism, said clamping spindle permitting a longitudinal adjustment of the shifting device relative to the holding device in order to permit an exact positioning of the steering wheel with respect to a driver. The clamping spindle 52 bears the latch 50 and ensures that the latch 50 with its corresponding latching hooks enters into engagement with the latching recesses 442 in the second connection portion 42 of the deformation element 4 when the steering column or steering column position is locked in its position. Such a device is basically known.

The deformation portion 44 is in turn connected both to the first connection portion 40 and to the second connection portion 42 and is designed in such a manner that the deformation axis 400, about which the deformation portion 44 is deformed during a relative displacement of the first connection portion 40 in relation to the second connection portion 42, is arranged substantially parallel to the direction of the surface normal 200 both of the first connection portion 40 and also parallel to the direction of the surface normal 200 of the second connection portion 42. Furthermore, the direction of the surface normal 200 is arranged orthogonally to the displacement plane 320 in which the displacement axis 300 lies.

Figure 10:
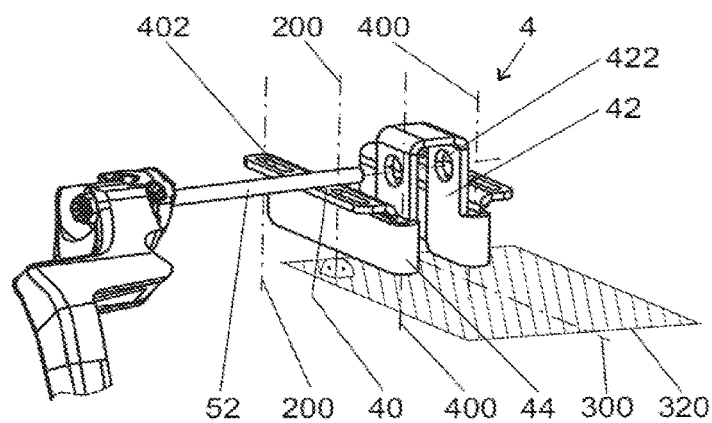
FIG. 10 is a schematic perspective view of a yet another example deformation element with a clamping device.

FIG. 10 shows, in a further exemplary embodiment, a deformation element 4 which comprises a first connection portion 40 which has form-fitting recesses 402, by means of which the first connection portion 40 can be brought into engagement with the holding device 2. Furthermore, a second connection portion 42 is provided which comprises mounting bores 422 which can be brought into engagement with the shifting device 3 via a clamping spindle 52. The deformation portion 44 is arranged in such a manner that the deformation axis 400 is arranged substantially parallel to the direction of the surface normal 200 of the first connection portion 400. Furthermore, the direction of the surface normal of the first connection portion 400 is orthogonal with respect to the displacement plane 320.

To the extent useable, all of the individual features which are illustrated in the individual exemplary embodiments can be combined and/or interchanged with one another without departing from the scope of the invention.

LIST OF REFERENCE SIGNS

1 Steering column
10 Steering spindle
12 Front portion
100 Steering spindle axis
2 Holding device
20 Mounting recess
22 Side cheek
24 Form-fitting element
26 Channel-shaped guide
28 Elongated hole 200 Surface normal
280 Channel base
282 Channel wall
3 Shifting device
30 Mounting bolt
32 Lock nut
34 Form-fitting element
300 Displacement axis
320 Displacement plane
4 Deformation element
40 First connection portion
42 Second connection portion
44 Deformation portion
46 Tearing line
400 Deformation axis
402 Form-fitting recess
422 Installation bore
424 Latching recess
440 Inner region
442 Outer region
460 Slot
50 Latch
52 Clamping spindle

What is claimed is:

1. A steering column for a motor vehicle, the steering column comprising:
    a holding device that is connectable to a chassis of the motor vehicle;
    a shifting device configured to receive a steering spindle, wherein in a crash event the shifting device is displaceable relative to the holding device along a displacement axis; and
    a deformation element connected via respective fastening means to the holding device via a first connection portion and to the shifting device via a second connection portion, the deformation element comprising a deformation portion that is deformed about a deformation axis during displacement of the shifting device relative to the holding device, wherein the deformation axis is oriented substantially parallel to a surface normal of at least one of the first connection portion or the second connection portion in a center of the associated fastening means,
    wherein the deformation portion is a first deformation portion and the deformation element comprises a second deformation portion, wherein both the first and second deformation portions are connected to the second connection portion, and
    wherein the first connection portion includes a first part and a second part, wherein the first part of the first connection portion is in communication with the first deformation portion and the second part of the first connection portion is in communication with the second deformation portion.

2. The steering column of claim 1 wherein the deformation portion is configured such that during displacement of the shifting device relative to the holding device the deformation axis moves in a direction of the displacement axis in a manner substantially parallel to a starting position of the deformation axis.

3. The steering column of claim 1 wherein the deformation element is positioned on the holding device via the first connection portion and on the shifting device via the second connection portion, wherein at least one of the first connection portion or the second connection portion is perpendicular to the surface normal.

4. The steering column of claim 1 wherein the first connection portion and the second connection portion are disposed in a common plane.

5. The steering column of claim 1 wherein the deformation portion is bent around the deformation axis and comprises an inner region and an outer region that lie opposite one another and that lie substantially parallel to a plane spanned by the deformation axis and the displacement axis.

6. The steering column of claim 1 wherein the deformation portion is bent around the deformation axis and comprises an inner region and an outer region that lie opposite one another and that lie parallel to a plane spanned by the deformation axis and the displacement axis.

7. The steering column of claim 1 wherein at least one of the first connection portion or the second connection portion comprises form-fitting recesses that engage with mutually complementary form-fitting elements of at least one of the holding device or the shifting device.

8. The steering column of claim 1 wherein the first and second deformation portions are oriented substantially parallel to one another, wherein the first and second connection portions are positioned perpendicular to planes in which the first and second deformation portions lie.

9. The steering column of claim 1 wherein the deformation portion is positioned perpendicular to a displacement direction next to the first and second connection portions.

10. The steering column of claim 1 wherein the first connection portion or the second connection portion comprises at least one of
    latching recesses for receiving a latch in a steering column that is adjustable in a longitudinal direction, or
    mounting bores for receiving a clamping spindle in a steering column that is adjustable in the longitudinal direction.

11. A steering column for a motor vehicle, the steering column comprising:
    a holding device that is connectable to a chassis of the motor vehicle;
    a shifting device configured to receive a steering spindle, wherein in a crash event the shifting device is displaceable relative to the holding device along a displacement axis; and
    a deformation element connected to the holding device via a first connection portion and to the shifting device via a second connection portion, the deformation element comprising a deformation portion that is deformed about a deformation axis during displacement of the shifting device relative to the holding device, wherein the deformation axis is substantially normal to at least one of the first connection portion or the second connection portion,
    wherein the first connection portion is connected to the first deformation portion along a tearing line, wherein during displacement of the shifting device relative to the holding device the deformation element tears along the tearing line.

12. The steering column of claim 11 wherein the deformation element includes two deformation portions that are substantially parallel to one another.

13. The steering column of claim 11 wherein the deformation portion of the deformation element is U-shaped.

14. The steering column of claim 11 wherein the deformation element is mounted within a channel-shaped guide of the holding device.

15. The steering column of claim 11 wherein the holding device is configured as a sliding capsule.

16. A steering column for a motor vehicle, the steering column comprising:
- a holding device that is connectable to a chassis of the motor vehicle;
- a shifting device configured to receive a steering spindle, wherein in a crash event the shifting device is displaceable relative to the holding device along a displacement axis; and
- a deformation element connected via respective fastening means to the holding device via a first connection portion and to the shifting device via a second connection portion, the deformation element comprising a deformation portion that is deformed about a deformation axis during displacement of the shifting device relative to the holding device, wherein the deformation axis is oriented substantially parallel to a surface normal of at least one of the first connection portion or the second connection portion in a center of the associated fastening means,
- wherein the deformation portion is a first deformation portion and the deformation element comprises a second deformation portion, wherein both the first and second deformation portions are connected to the second connection portion, and
- wherein the first and second deformation portions are oriented substantially parallel to one another, wherein the first and second connection portions are positioned perpendicular to planes in which the first and second deformation portions lie.

17. A steering column for a motor vehicle, the steering column comprising:
- a holding device that is connectable to a chassis of the motor vehicle;
- a shifting device configured to receive a steering spindle, wherein in a crash event the shifting device is displaceable relative to the holding device along a displacement axis; and
- a deformation element connected via respective fastening means to the holding device via a first connection portion and to the shifting device via a second connection portion, the deformation element comprising a deformation portion that is deformed about a deformation axis during displacement of the shifting device relative to the holding device, wherein the deformation axis is oriented substantially parallel to a surface normal of at least one of the first connection portion or the second connection portion in a center of the associated fastening means,
- wherein the deformation portion is positioned perpendicular to a displacement direction next to the first and second connection portions.

* * * * *